(12) United States Patent
Segawa et al.

(10) Patent No.: US 10,474,876 B2
(45) Date of Patent: Nov. 12, 2019

(54) IMAGE PROCESSING APPARATUS AND IMAGE PROCESSING METHOD

(71) Applicant: Sony Interactive Entertainment Inc., Tokyo (JP)

(72) Inventors: Hiroyuki Segawa, Kanagawa (JP); Tetsugo Inada, Kanagawa (JP); Akio Ohba, Kanagawa (JP); Hirofumi Okamoto, Tokyo (JP); Atsushi Kimura, Tokyo (JP); Daisuke Tahara, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 358 days.

(21) Appl. No.: 15/353,882

(22) Filed: Nov. 17, 2016

(65) Prior Publication Data
US 2017/0161547 A1 Jun. 8, 2017

(30) Foreign Application Priority Data
Dec. 4, 2015 (JP) ................. 2015-237227

(51) Int. Cl.
*G06K 9/00* (2006.01)
*G06K 9/46* (2006.01)
*G06T 7/73* (2017.01)

(52) U.S. Cl.
CPC ..... *G06K 9/00228* (2013.01); *G06K 9/00288* (2013.01); *G06K 9/00362* (2013.01);
(Continued)

(58) Field of Classification Search
CPC .......... G06K 9/00228; G06K 9/00288; G06K 9/4604; G06K 9/00778; G06K 9/00362; G06T 7/75; G06T 2207/30201; G06T 2207/10028; G06T 2207/30242; G06T 2207/10021
See application file for complete search history.

(56) References Cited

U.S. PATENT DOCUMENTS 7,003,134 B1 * 2/2006 Covell ............... G06K 9/00369
382/103
8,355,529 B2 * 1/2013 Wu ....................... A61B 5/1113
345/420

(Continued)

OTHER PUBLICATIONS

Jonathan Deutscher and Ian Reid "Articulated Body Motion Capture by Stochastic Search" (International Journal of Computer Vision, 2005), Department of Engineering Science, University of Oxford, Oxford, OX13PJ, United Kingdom, 33 pages, Received Aug. 19, 2003.

(Continued)

*Primary Examiner* — Wesley J Tucker
(74) *Attorney, Agent, or Firm* — Matthew B. Dernier, Esq.

(57) ABSTRACT

Disclosed herein is an image processing apparatus including: a priority degree setting section configured to set a degree of priority for each of surrounding regions of a plurality of people detected from an input image; and a pose estimation section configured to estimate poses of human body models for human body regions extracted from the input image one after another, on the basis of the surrounding regions of one or more of the people selected using the degrees of priority set by the priority degree setting section.

19 Claims, 14 Drawing Sheets

(52) U.S. Cl.
CPC ....... *G06K 9/00778* (2013.01); *G06K 9/4604* (2013.01); *G06T 7/75* (2017.01); *G06T 2207/10021* (2013.01); *G06T 2207/10028* (2013.01); *G06T 2207/30201* (2013.01); *G06T 2207/30242* (2013.01)

(56) References Cited

U.S. PATENT DOCUMENTS

| | | | | |
|---|---|---|---|---|
| 8,958,600 | B2* | 2/2015 | Othmezouri | G06K 9/00362 |
| | | | | 382/103 |
| 9,008,436 | B2* | 4/2015 | Ptucha | G06K 9/00228 |
| | | | | 382/118 |
| 9,275,276 | B2* | 3/2016 | Kawaguchi | G06T 7/251 |
| 9,846,845 | B2* | 12/2017 | Sigal | G06N 99/005 |
| 2009/0238549 | A1* | 9/2009 | Kanayama | H04N 5/23212 |
| | | | | 396/95 |
| 2009/0324020 | A1* | 12/2009 | Hasebe | G06K 9/00228 |
| | | | | 382/115 |
| 2011/0150278 | A1* | 6/2011 | Shimizu | G06K 9/00288 |
| | | | | 382/103 |
| 2013/0142390 | A1* | 6/2013 | Othmezouri | G06K 9/00362 |
| | | | | 382/103 |
| 2013/0230211 | A1* | 9/2013 | Tanabiki | G06K 9/00342 |
| | | | | 382/103 |
| 2013/0271458 | A1* | 10/2013 | Andriluka | G06K 9/00342 |
| | | | | 345/420 |
| 2016/0034763 | A1* | 2/2016 | Takanaka | G06K 9/00751 |
| | | | | 386/241 |
| 2017/0262736 | A1* | 9/2017 | Yu | G06K 9/00718 |
| 2017/0337692 | A1* | 11/2017 | Romanenko | G06T 11/00 |
| 2019/0147292 | A1* | 5/2019 | Watanabe | G06K 9/6215 |
| | | | | 382/103 |

OTHER PUBLICATIONS

S. Corazza, L. Mundermann, A. M. Chaudhari, T. Demattio, C. Cobelli, T. P. Andriacchi, "A Markerless Motion Capture System to Study Musculoskeletal Biomechanics: Visual Hull and Simulated Annealing Approach," Annals of Biomedical Engineering—Ann Biomed Eng, vol. 34, No. 6, pp. 1019-1029, Jun. 2006.

* cited by examiner

FIG.2

| ESTIMATION OBJECTIVE | |
|---|---|
| NUMBER OF PEOPLE | 3 |
| LIST OF TARGET PEOPLE | PERSON A, PERSON B, PERSON C |
| PRIORITY ORDER LIST OF TARGET PEOPLE | ①PERSON B, ②PERSON C, ③PERSON A |
| LIST OF PEOPLE TO EVADE | PERSON X, PERSON Y, PERSON Z |

FIG. 6A PLEASE SELECT NUMBER OF PLAYERS

FIG. 6B PLEASE SELECT PLAYER(S)

FIG. 6C PLEASE SPECIFY ORDER OF PLAYERS

FIG. 6D PLEASE SELECT SPECTATOR(S) WHO ARE NOT PLAYER(S)

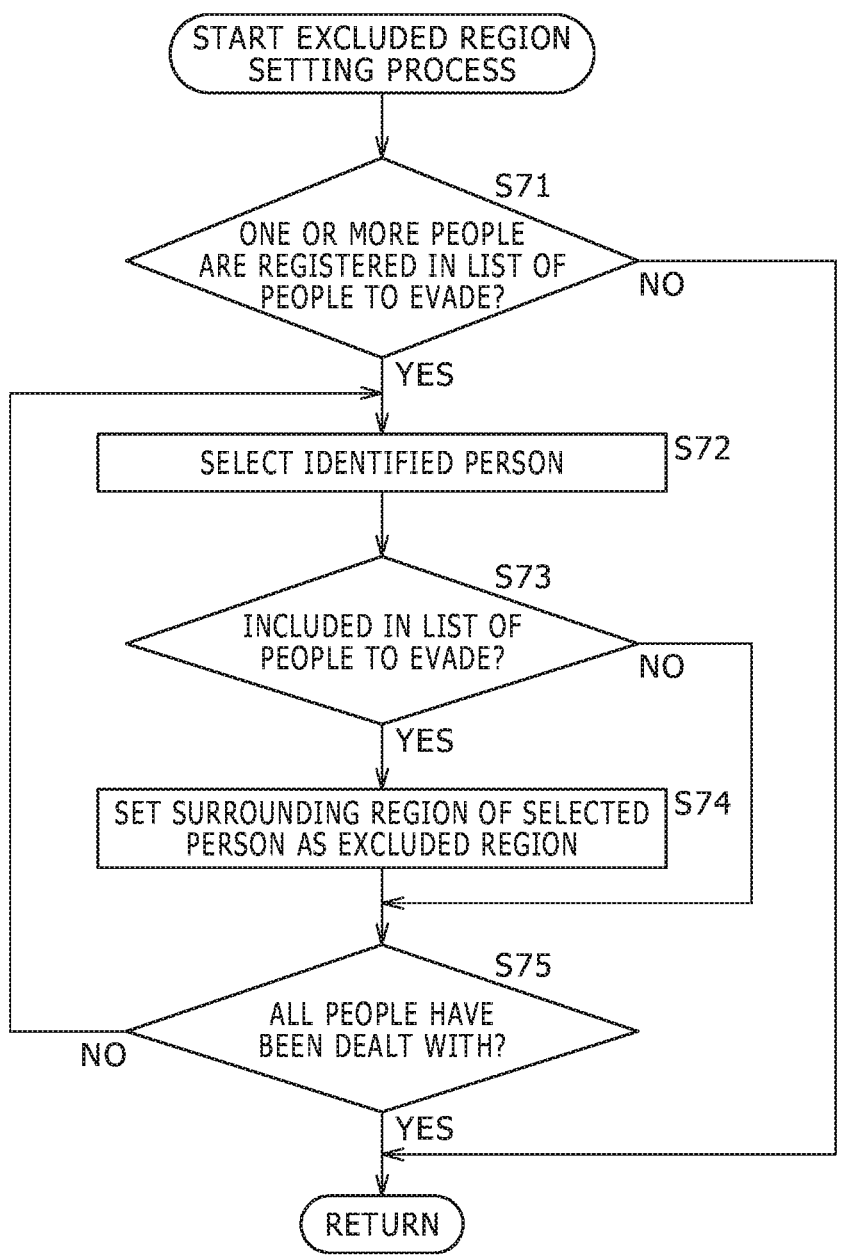

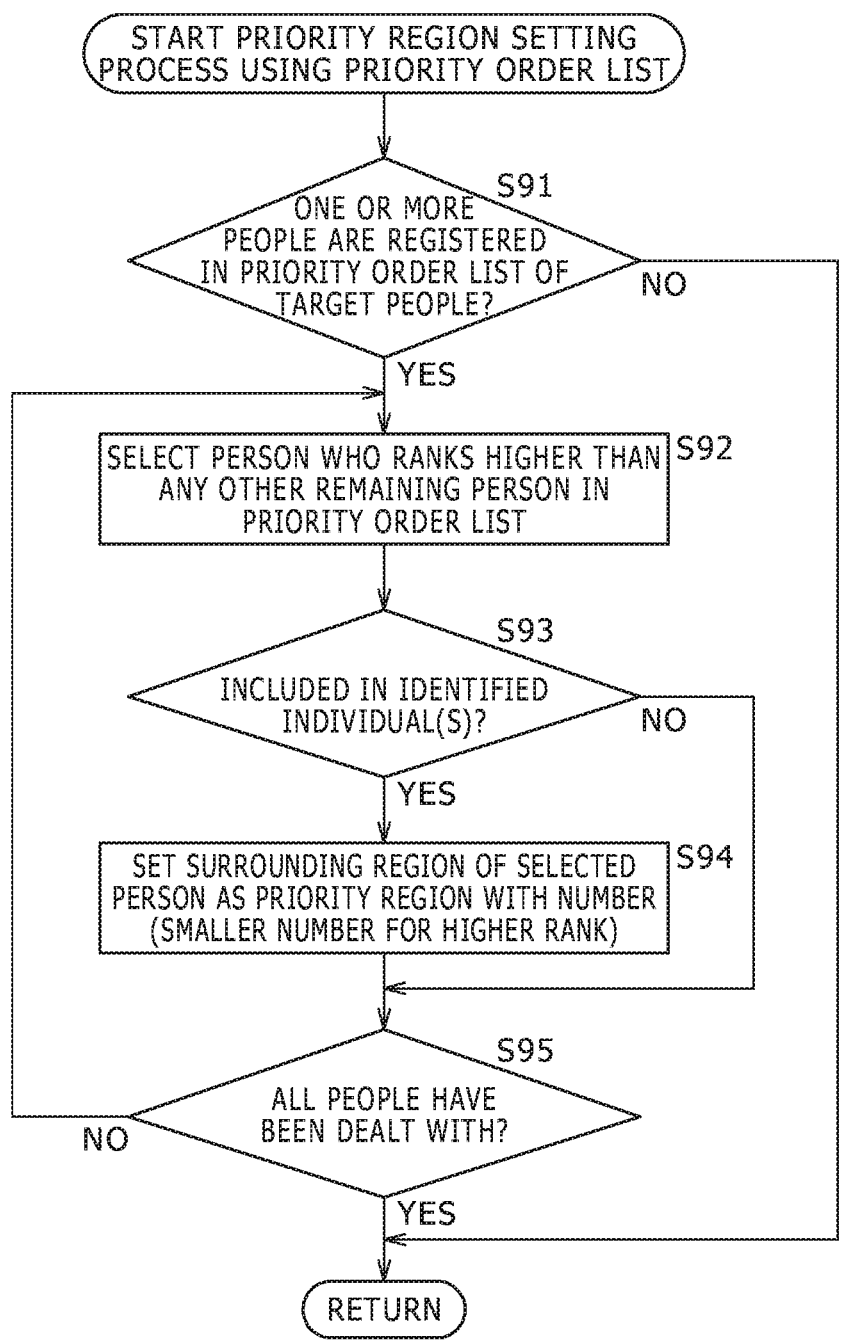

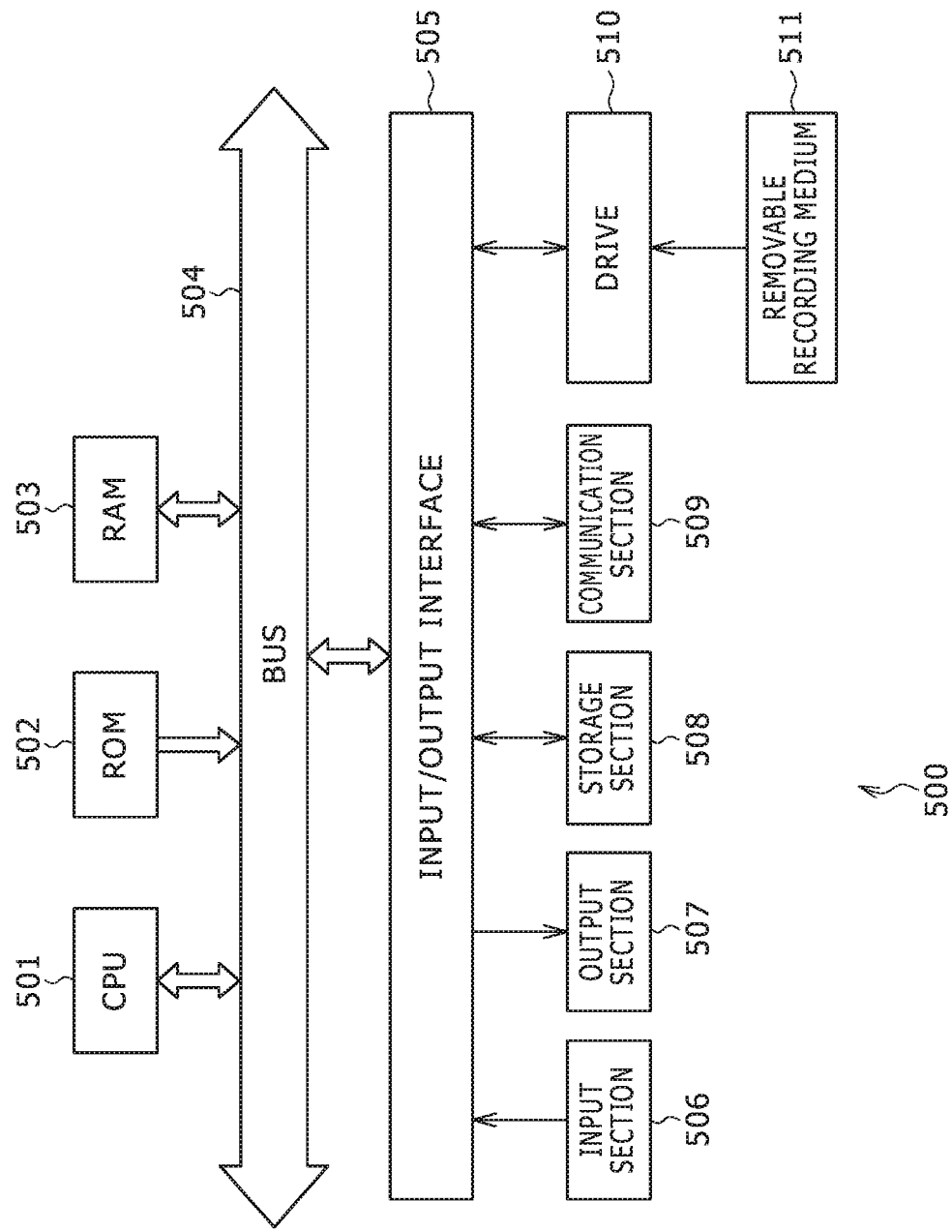

IMAGE PROCESSING APPARATUS AND IMAGE PROCESSING METHOD

BACKGROUND

The present disclosure relates to an image processing apparatus and an image processing method, and, in particular, to an image processing apparatus and an image processing method which are able to achieve fast and stable processing even in the case where poses of a plurality of people are estimated simultaneously.

There is a known pose estimation technique which performs pose estimation by applying, through energy optimization, a human body model to a silhouette region of a moving subject portion extracted from an input image supplied from a camera or the like by a background subtraction algorithm or the like (see, for example, "Articulated Body Motion Capture by Stochastic Search" (International Journal of Computer Vision, 2005), JONATHAN DEUTSCHER AND LAN REID, Department of Engineering Science, University of Oxford, Oxford, OX13PJ, United Kingdom, Received Aug. 19, 2003).

There is also a known technique which performs optimization of human body models while employing a visual hull technique, which involves a three dimensional projection of silhouettes of a plurality of moving subject portions to estimate three-dimensional shapes representing human body portions (see, for example, "A Markerless Motion Capture System to Study Musculoskeletal Biomechanics: Visual Hull and Simulated Annealing Approach," S. Corazza, L. Mundermann, A. M. Chaudhari, T. Demattio, C. Cobelli, T. P. Andriacchi, Annals of Biomedical Engineering—ANN BIOMED ENG, vol. 34, no. 6, pp. 1019-1029, 2006).

SUMMARY

Each of the above techniques involves an energy function optimization problem, and requires a very large amount of computation, because the human body model, which is to be optimized, has a very large number of parameters. Moreover, when the poses of a plurality of people are to be estimated simultaneously, the number of parameters increases further, leading to a still larger amount of computation required.

Further, when the poses of a plurality of people are to be estimated simultaneously, each of regions in which human bodies exist has a more complicated shape than in the case where the pose of only one person is to be estimated, in optimization for the silhouettes and in optimization for the three-dimensional shapes, and it is therefore difficult to achieve a correct pose estimation with stability.

As described above, it has been difficult to continue to estimate correct poses for a plurality of people quickly and with stability.

The present disclosure has been made in view of the above circumstances, and enables fast and stable processing even in the case where the poses of a plurality of people are estimated simultaneously.

An image processing apparatus according to one embodiment of the present technique includes: a priority degree setting section configured to set a degree of priority for each of surrounding regions of a plurality of people detected from an input image; and a pose estimation section configured to estimate poses of human body models for human body regions extracted from the input image one after another, on the basis of the surrounding regions of one or more of the people selected using the degrees of priority set by the priority degree setting section.

An image processing method according to one embodiment of the present technique is employed by an image processing apparatus, and includes: setting a degree of priority for each of surrounding regions of a plurality of people detected from an input image; and estimating poses of human body models for human body regions extracted from the input image one after another, on the basis of the surrounding regions of one or more of the people selected using the set degrees of priority.

According to one embodiment of the present technique, a degree of priority is set for each of surrounding regions of a plurality of people detected from an input image, and poses of human body models for human body regions extracted from the input image are estimated one after another on the basis of the surrounding regions of one or more of the people selected using the set degrees of priority.

The embodiments of the present technique enable fast and stable processing even in the case where the poses of a plurality of people are estimated simultaneously.

Note that advantageous effects described in the present specification are merely example advantageous effects of the present technique, and that there may be other advantageous effects of the present technique in addition to the advantageous effects described in the present specification.

BRIEF DESCRIPTION OF THE DRAWINGS

FIG. 2 is a diagram illustrating an example of information as to an estimation objective;

FIG. 10 is a flowchart for explaining an excluded region setting process, which is performed at step S51 in FIG. 7;

FIG. 11 is a flowchart for explaining a priority region setting process using a priority order list, which is performed at step S52 in FIG. 7;

FIG. 14 is a block diagram illustrating an exemplary structure of a personal computer.

DETAILED DESCRIPTION OF THE PREFERRED EMBODIMENT

Hereinafter, a mode for carrying out the present disclosure (hereinafter referred to as an embodiment) will be described.

<Exemplary Structure of Image Processing Apparatus>

Figure 1:
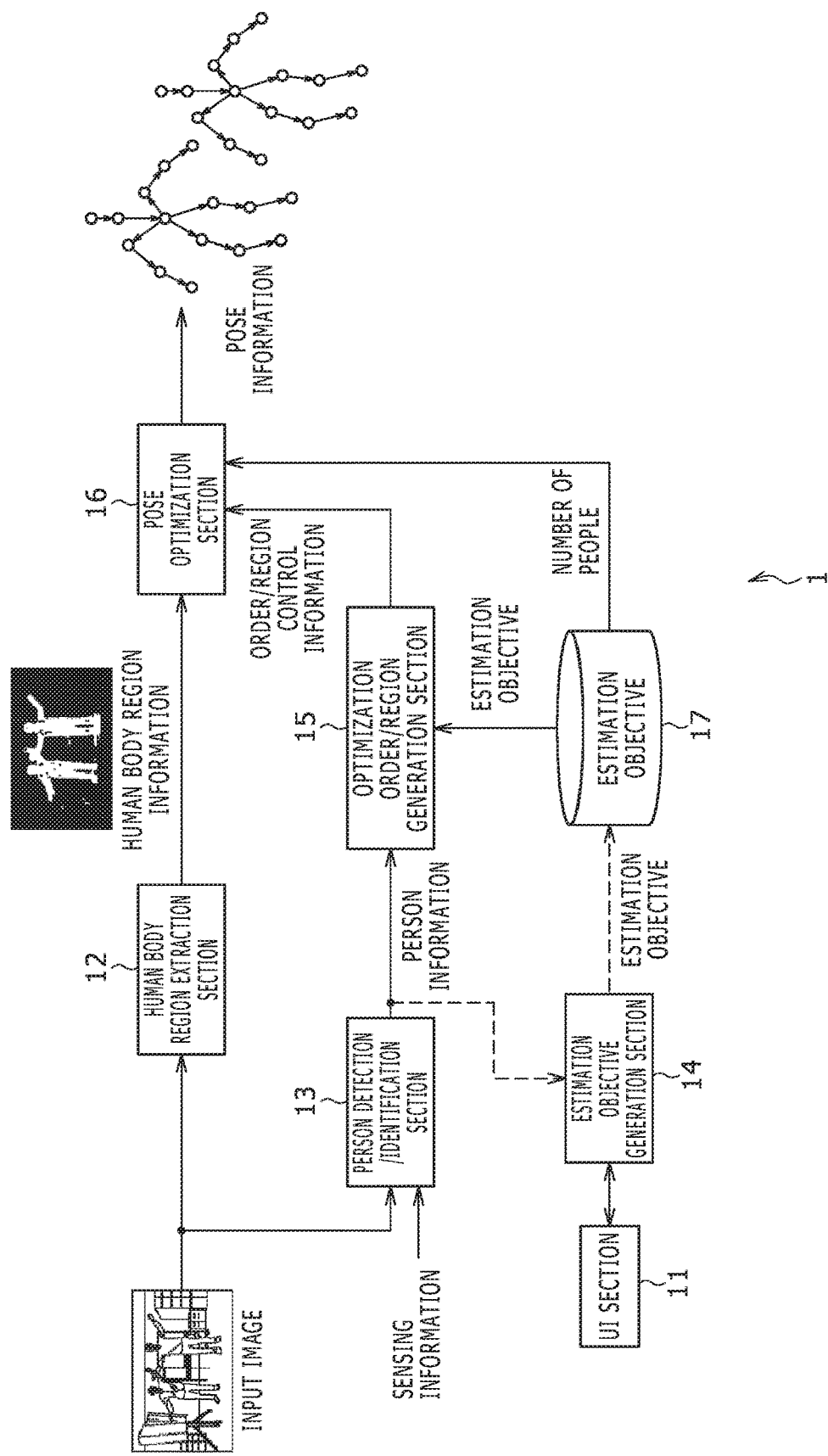
FIG. 1 is a block diagram illustrating an exemplary structure of an image processing apparatus according to an embodiment of the present technique.

FIG. 1 is a diagram illustrating an exemplary structure of an image processing apparatus 1 according to an embodiment of the present technique. The image processing apparatus 1 illustrated in FIG. 1 extracts a region that seems to represent a human body from an input image inputted from a camera or the like, and performs image processing of optimizing joint positions and angles of a model for the human body so as to agree with the extracted region that seems to represent the human body. An exemplary case where there are a plurality of users will be described in the following description of the present embodiment.

In the embodiment illustrated in FIG. 1, the image processing apparatus 1 includes a user interface (UI) section 11, a human body region extraction section 12, a person detection/identification section 13, an estimation objective generation section 14, an optimization order/region generation section 15, a pose optimization section 16, and an estimation objective storage section 17. An image, which will be referred to as an input image, is inputted to the human body region extraction section 12 and the person detection/identification section 13 from an external source (not shown).

The UI section 11 outputs an operation screen to a monitor (not shown), and supplies instruction information corresponding to an operation performed and inputted by a user using a remote controller, a stick, or the like to the estimation objective generation section 14.

The human body region extraction section 12 extracts, from the input image, a spatial region in which a human body to be recognized can exist. For example, a region that seems to represent a human body is extracted from the input image using a background subtraction algorithm, and human body region information is generated on the basis of this extraction and is outputted to the pose optimization section 16.

Using the input image or sensing information from a sensor, such as, for example, an infrared sensor or a laser positioning sensor (the input image and the sensing information will be referred to collectively as input information as appropriate), the person detection/identification section 13 detects a region in which a person seems to exist, discerns an individual, and/or identifies an individual, and generates person information. Note that processes performed by the person detection/identification section 13 may or may not involve an identification of an individual.

Specifically, using the input information, the person detection/identification section 13 performs operations including the following operations. Examples of the operations that do not involve an identification of an individual include: face detection (detection of the position and size of a face); detection of a representative depth value (depth information) of a human body region; and identification of the number of people (for example, the total number of faces detected by face detection). Examples of the operations that involve an identification of an individual include: face recognition (identifying an individual); extraction of a representative color or pattern of clothing from an area in which a human body seems to exist; and detection of a specific object, such as a marker (a sign attached to a body for individual identification), a controller used in a game or the like, or a racket, a bat, or the like used in a sport. The person detection/identification section 13 outputs the position, the size, and/or a label for individually identifying a person.

The person detection/identification section 13 outputs the generated person information to the estimation objective generation section 14 and the optimization order/region generation section 15.

On the basis of the instruction information corresponding to the operation performed by the user, the instruction information being supplied from the UI section 11, and/or the person information supplied from the person detection/identification section 13, the estimation objective generation section 14 determines an estimation objective (i.e., setting values for a pose estimation), such as the number of people to be recognized, before starting the pose estimation. An example of the estimation objective determined by the estimation objective generation section 14 is: "Estimations are to be performed for two people, person A and person B, with priority given to an estimation for person A, and an estimation is not to be performed for person C, who is in their neighborhood."

Specifically, the estimation objective generation section 14 generates information as to an estimation objective as illustrated in FIG. 2. For example, information as to an estimation objective stating that the number of people is "3," that a list of target people is "person A, person B, person C," that a priority order list of target people is "1. person B, 2. person C, 3. person A," and that a list of people to evade is "person X, person Y, person Z," is generated and is stored in the estimation objective storage section 17.

A person may be specified as a person to evade and be listed in the list of people to evade (in this case, a low degree of priority may be set for this person). Alternatively, for example, a person or people who is or are not registered in the list of target people and who ranks or rank lowest in a priority order list may be registered in the list of people to evade. Note that the degree of priority may be used instead of the order of priority. Higher ranks in the order of priority mean higher degrees of priority, and people who have lower degrees of priority may be registered at higher positions in the list of people to evade.

In addition, the estimation objective generation section 14 causes the UI section 11 to generate an operation screen for identifying a person on the basis of the person information supplied from the person detection/identification section 13.

Using the person information supplied from the person detection/identification section 13, the optimization order/region generation section 15 generates control information, which may include an order in which pose estimations for a plurality of people are to be performed, regions for which estimations are to be performed, and/or the like. Specifically, the optimization order/region generation section 15 refers to each list in the estimation objective supplied from the estimation objective storage section 17 to set the order of priority (the degrees of priority) and determine the order of estimations and/or estimation regions and an excluded region, and makes them the control information. The control information will be hereinafter referred to as "order/region control information" as appropriate.

Note that the optimization order/region generation section 15 may alternatively set the order of priority (the degrees of priority) and determine the order of estimations and/or the estimation regions and the excluded region on the basis of the person information supplied from the person detection/identification section 13 and a specific rule, without using the information as to the estimation objective supplied from the estimation objective storage section 17.

Examples of specific operations that may be performed when the information as to the estimation objective is not used are as follows.

When faces have been detected by face detection, a face with a larger detection frame is more likely than not on this side of a face with a smaller detection frame, and therefore, faces with larger detection frames may be placed at higher positions in the order of priority (that is, given higher degrees of priority).

When depth information is available, an object on this side of (i.e., closer to the user than) another object may be placed at a higher position in the order of priority than the other object.

An order of priority may be set for a frame to be dealt with, not by judging from relative magnitudes of the depth information (for example, depth values in a depth map), but using relative magnitudes of distance values (which are essentially the same as the depth values) calculated from a result of pose estimations for a plurality of people in an immediately previous frame dealt with. Specifically, in the case of a situation in which two people are side by side, for example, if the person on the right is estimated to be on this side of the person on the left as a result of pose estimations for the plurality of people in the immediately previous frame, the person on the right is more likely than not on this side of the person on the left also in a next frame to be dealt with, and therefore, a higher degree of priority may be set for a region corresponding to the person on the right.

In the case where a face has been detected by face detection, if a detection frame of the detected face is smaller than a certain threshold, a region corresponding to this person may be set as an excluded region.

Note that, regarding the depth information, at a position facing the user, this side and the far side are shown on the basis of, for example, an imaging apparatus that captures the input image.

The optimization order/region generation section 15 outputs the generated order/region control information to the pose optimization section 16.

Using the human body region information supplied from the human body region extraction section 12, the pose optimization section 16 performs pose estimations for a plurality of people one after another according to the order of priority (the degrees of priority) based on the order/region control information supplied from the optimization order/region generation section 15. The pose estimation is a process of optimizing parameters of the pose of a human body model (which has a tree structure), such as joint positions and angles and the number of joints, so as to agree with a region in which a human body can exist, and the parameters are optimized to make a silhouette of the human body model agree with the human body region information obtained from the input image. At this time, the degree of agreement (for example, the sum of the absolute values of differences) is set as energy, and the parameters (e.g., the joint positions and angles, and the number of joints) of the pose or the like are optimized to minimize the energy. The pose optimization section 16 excludes a region that has been determined to be the excluded region from a region for which a pose estimation is to be performed, or prohibits a pose estimation process from being performed for the region that has been determined to be the excluded region.

In the pose optimization section 16, the pose estimation is continued until, for example, it becomes difficult to perform estimation, the number of people in the estimation objective supplied from the estimation objective storage section 17 is reached, or the total number of people the faces of whom have been detected by the person detection/identification section 13 is reached.

The estimation objective storage section 17 stores the information as to the estimation objective generated by the estimation objective generation section 14.

Figure 3:
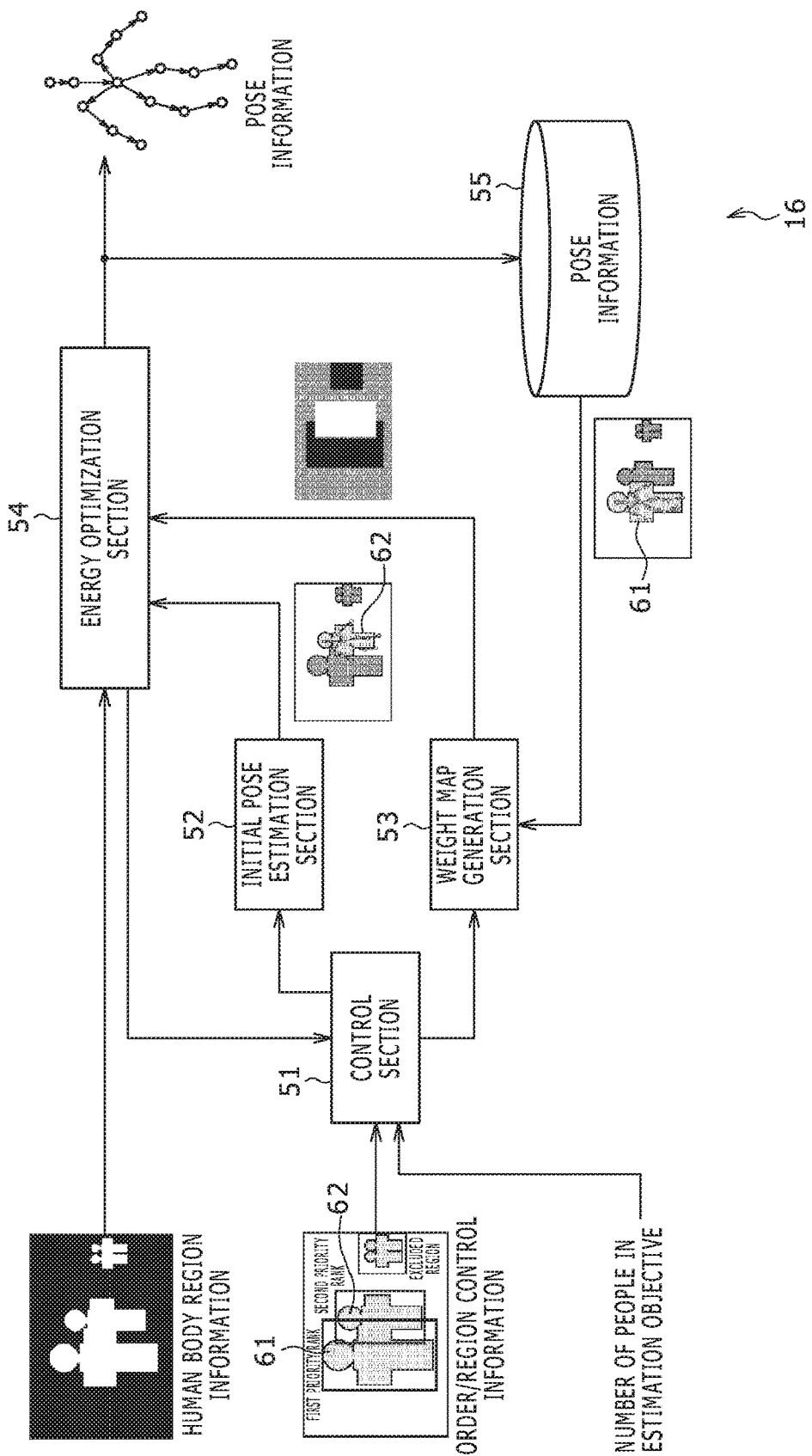
FIG. 3 is a block diagram illustrating an exemplary structure of a pose optimization section.

FIG. 3 is a block diagram illustrating an exemplary structure of the pose optimization section 16.

The pose optimization section 16 includes a control section 51, an initial pose estimation section 52, a weight map generation section 53, an energy optimization section 54, and a pose information storage section 55. FIG. 3 illustrates an example situation in which a pose estimation has been finished for a person 61 who ranks first in the order of priority, and a pose estimation is now to be performed for a person 62 who ranks second in the order of priority.

The human body region information is inputted from the human body region extraction section 12 to the energy optimization section 54. The order/region control information is inputted from the optimization order/region generation section 15 to the control section 51, the initial pose estimation section 52, and the weight map generation section 53.

The control section 51 selects the target people for whom the pose estimations are to be performed one after another according to the order of priority (i.e., in descending order of the degree of priority) on the basis of the order/region control information, and, for each target person selected, causes the initial pose estimation section 52 to perform an initial pose estimation, and causes the weight map generation section 53 to generate a weight map. In addition, the control section 51 acquires the number of people in the estimation objective from the estimation objective storage section 17, and controls the initial pose estimation section 52 and the weight map generation section 53 to allow a pose optimization process to be continued until the number of people in the estimation objective is reached, for example. That is, the process is prohibited after the number of people in the estimation objective is reached.

Under control of the control section 51, the initial pose estimation section 52 sets an initial pose near a region in which the selected target person is likely to exist on the basis of the order/region control information, and outputs information as to the set initial pose to the energy optimization section 54.

Information as to the region corresponding to any person for whom the estimation has already been performed is inputted from the pose information storage section 55 to the weight map generation section 53. Under control of the control section 51, the weight map generation section 53 generates weights for the region corresponding to the target person for whom the estimation is to be performed, a surrounding region of the person for whom the estimation has already been performed, and the excluded region, on the basis of the order/region control information and the information as to the region corresponding to the person for whom the estimation has already been performed. The weight map generation section 53 outputs the weight map, which is information as to the generated weights, to the energy optimization section 54.

The energy optimization section 54 performs successive pose estimations that each optimize the pose so as to minimize the degree of disagreement (i.e., energy) determined by the pose of the human body model in relation to the human body region information supplied from the human body region extraction section 12. At this time, initial values of the position and pose of the human body model supplied from the initial pose estimation section 52 are used, and the weight map supplied from the weight map generation section 53 is taken into account in optimization control and calculation of the energy to avoid influence of any region for which the estimation has already been performed and of any excluded region.

The energy optimization section 54 outputs information as to the optimized pose to a subsequent stage (not shown) and the pose information storage section 55. In addition, the energy optimization section 54 outputs, to the control section 51, a notification of completion of the pose estimation for the target person.

<Example Procedure Performed by Image Processing Apparatus>

Figure 4:
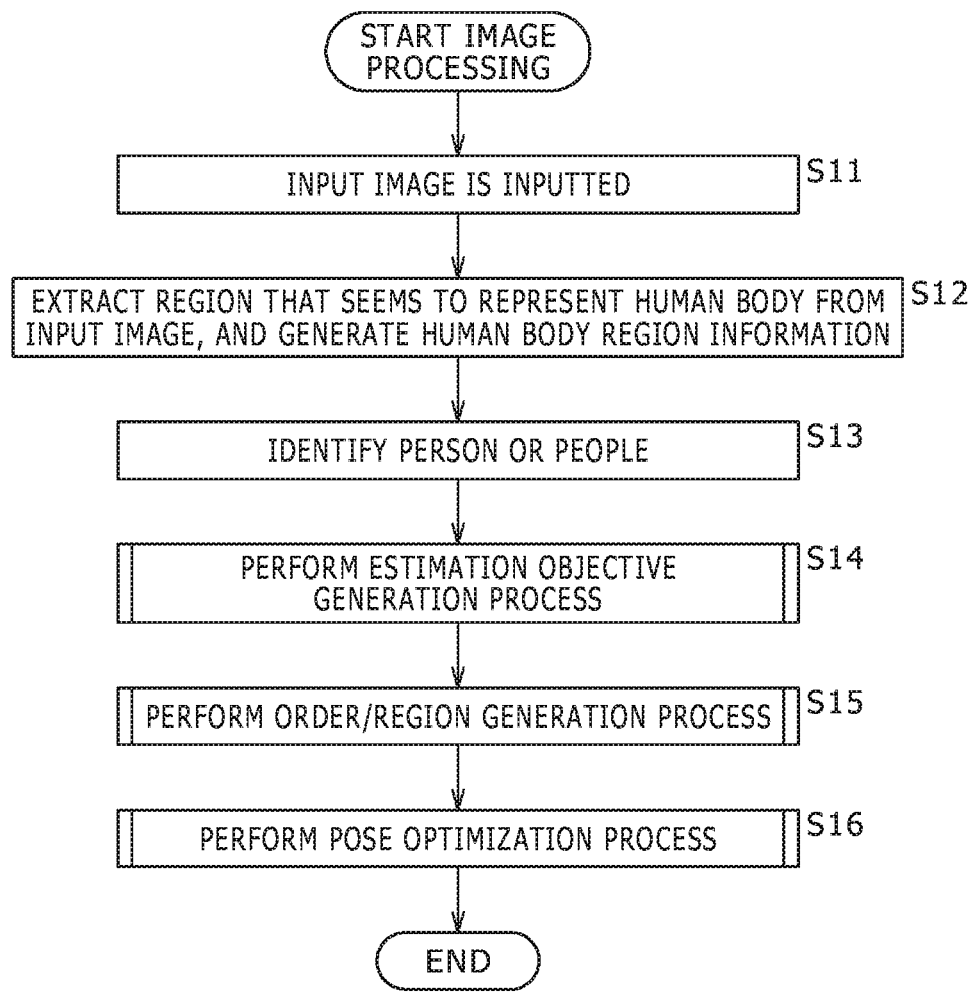
FIG. 4 is a flowchart for explaining image processing performed by the image processing apparatus.

Next, image processing performed by the image processing apparatus 1 will now be described below with reference to a flowchart of FIG. 4.

At step S11, the input image is inputted from the external source (e.g., an imaging apparatus), which is not shown, to the human body region extraction section 12 and the person detection/identification section 13.

At step S12, the human body region extraction section 12 extracts any region that seems to represent a human body from the input image inputted at step S11 using the background subtraction algorithm, and generates the human body region information. The human body region extraction section 12 outputs the generated human body region information to the pose optimization section 16.

At step S13, using the input image or the sensing information, the person detection/identification section 13 detects a region in which a person seems to exist, discerns an individual, and/or identifies a person, and generates the person information. The generated person information is outputted to the estimation objective generation section 14 and the optimization order/region generation section 15.

At step S14, on the basis of the instruction information corresponding to the operation performed by the user, the instruction information being supplied from the UI section 11, and/or the person information supplied from the person detection/identification section 13, the estimation objective generation section 14 performs a process of generating the estimation objective (i.e., the setting values for a pose estimation), such as the number of people to be recognized, before starting the pose estimation. This estimation objective generation process will be described below with reference to FIG. 5. In the process of step S14, the information as to the estimation objective is generated, and is stored in the estimation objective storage section 17.

At step S15, using the person information supplied from the person detection/identification section 13, the optimization order/region generation section 15 performs an order/region generation process of generating the control information, which may include the order in which the pose estimations for the plurality of people are to be performed, the regions for which the estimations are to be performed, and/or the like. This order/region generation process will be described below with reference to FIG. 7. In the process of step S15, the order/region control information is generated, and is outputted to the pose optimization section 16.

At step S16, the pose optimization section 16 performs the pose optimization process using the human body region information supplied from the human body region extraction section 12. The pose optimization process will be described below with reference to FIG. 13. In the process of step S16, the pose estimations for the plurality of people are performed one after another according to the order of priority based on the order/region control information supplied from the optimization order/region generation section 15.

As described above, in the case where a plurality of people exist, the pose estimations are performed one after another with the order of priority (i.e., the degrees of priority) set for the people, and this leads to faster and more stable processing.

Figure 5:
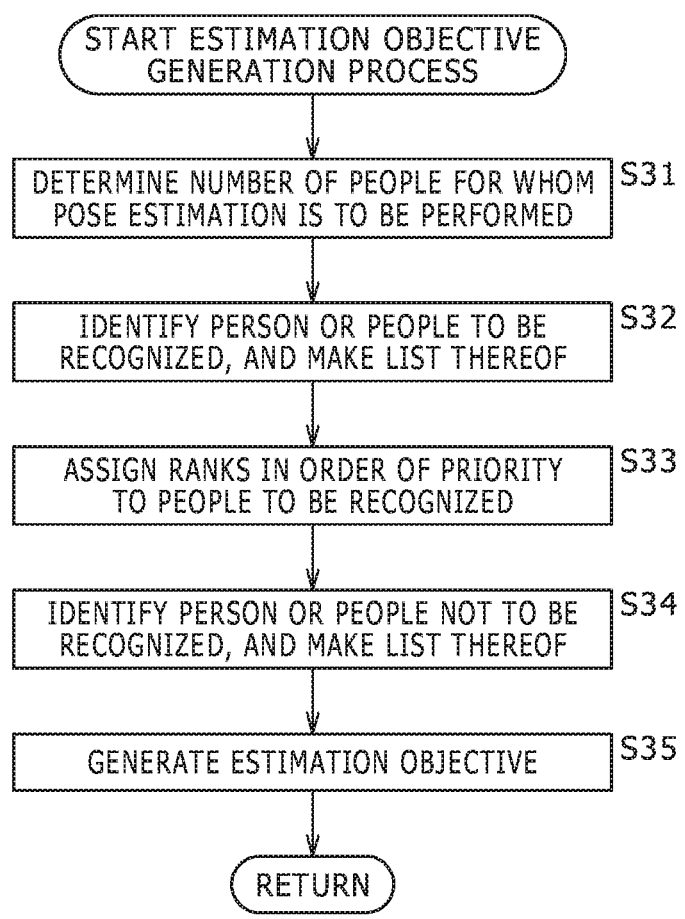
FIG. 5 is a flowchart for explaining an estimation objective generation process, which is performed at step S14 in FIG. 4.

Next, with reference to a flowchart of FIG. 5, the estimation objective generation process, which is performed at step S14 in FIG. 4, will now be described below. The estimation objective generation process is performed on the basis of the instruction information corresponding to the operation performed by the user, the instruction information being supplied from the UI section 11, and/or the person information supplied from the person detection/identification section 13.

Figure 6:
FIGS. 6A to 6D are diagrams illustrating example operation screens.

The UI section 11 causes the monitor to display an operation screen as illustrated in FIG. 6A, for example. FIG. 6A illustrates an example operation screen that prompts the user to select the number of players. In the operation screen, options of 1 to 5 players are presented as choices. In the lower right corner of the operation screen, a graphical user interface (GUI) that allows the user to skip this selection is presented, and the user is able to choose not to make a selection. Instruction information corresponding to an operation performed by the user is inputted from the UI section 11 to the estimation objective generation section 14.

At step S31, on the basis of the instruction information corresponding to the operation performed by the user, the instruction information being supplied from the UI section 11, and/or the person information supplied from the person detection/identification section 13, the estimation objective generation section 14 determines the number of people for whom the pose estimations are to be performed. In accordance with information as to this number of people, continuation and stop (prohibition) of the pose estimation process, which will be described below, are controlled. In the case where the above selection has been skipped, for example, the number of people for whom the pose estimations are to be performed is determined on the basis of the person information (e.g., a result of face detection) supplied from the person detection/identification section 13

Next, the UI section 11 causes the monitor to display an operation screen as illustrated in FIG. 6B, for example. FIG. 6B illustrates an example operation screen that prompts the user to select a player or players. In this operation screen, face images and names of five people are presented as choices. In the lower right corner of the operation screen, a GUI that allows the user to skip this selection is presented, and the user is able to choose not to make a selection. Instruction information corresponding to an operation performed by the user is inputted from the UI section 11 to the estimation objective generation section 14.

At step S32, on the basis of the instruction information corresponding to the operation performed by the user, the instruction information being supplied from the UI section 11, and/or the person information supplied from the person detection/identification section 13, the estimation objective generation section 14 identifies a person or people to be recognized, and makes a list of the person or people.

Next, the UI section 11 causes the monitor to display an operation screen as illustrated in FIG. 6C, for example. FIG. 6C illustrates an example operation screen that prompts the user to specify the order of the players. In this operation screen, character "1" and a face image of person B, character "2" and a face image of person C, and character "3" and a face image of person A are presented. In the lower right corner of the operation screen, a GUI that allows the user to skip this specification is presented, and the user is able to choose not to make a specification. Instruction information corresponding to an operation performed by the user is inputted from the UI section 11 to the estimation objective generation section 14.

At step S33, on the basis of the instruction information corresponding to the operation performed by the user, the instruction information being supplied from the UI section 11, and/or the person information supplied from the person detection/identification section 13, the estimation objective generation section 14 assigns ranks in the order of priority to the people to be recognized. Note that, instead of the ranks, degrees of priority may be assigned to the people to be recognized.

Next, the UI section 11 causes the monitor to display an operation screen as illustrated in FIG. 6D, for example. FIG. 6D illustrates an example operation screen that prompts the user to select spectators who are not players. In this operation screen, rectangles representing person A, person B, and person C with characters "3," "1," and "2," which indicate that they have been selected as players, superimposed thereon, and face images of person D, person E, person V, person W, person X, person Y, and person Z, who have not been selected, are presented. In the lower right corner of the operation screen, a GUI that allows the user to skip this selection is presented, and the user is able to choose not to make a selection. Instruction information corresponding to an operation performed by the user is inputted from the UI section 11 to the estimation objective generation section 14.

At step S34, on the basis of the instruction information corresponding to the operation performed by the user, the instruction information being supplied from the UI section 11, and/or the person information supplied from the person detection/identification section 13, the estimation objective generation section 14 identifies a person or people not to be recognized, and makes a list of the person or people.

At step S35, on the basis of the settings made at steps S31 to S34, the estimation objective generation section 14 generates information as to the estimation objective as illustrated in FIG. 2, for example, and causes the estimation objective storage section 17 to store the generated information as to the estimation objective.

Figure 7:
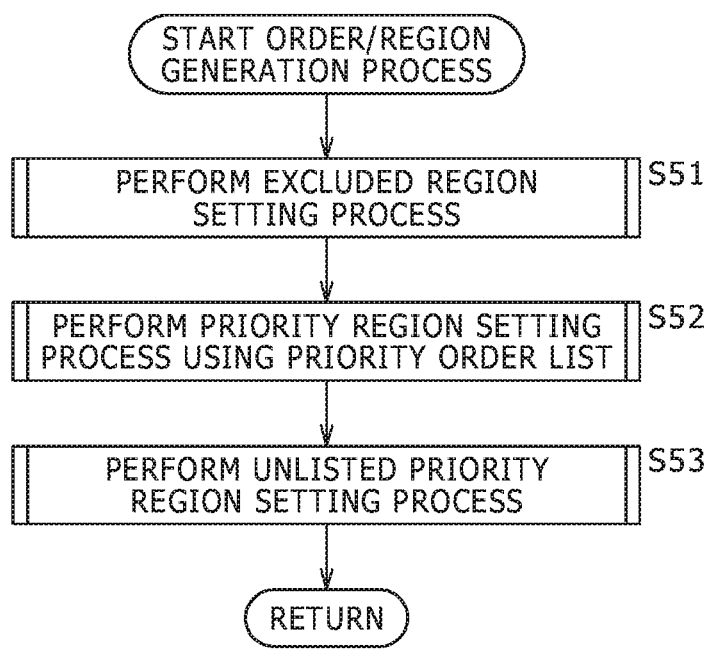
FIG. 7 is a flowchart for explaining an order/region generation process, which is performed at step S15 in FIG. 4.
Figure 8:
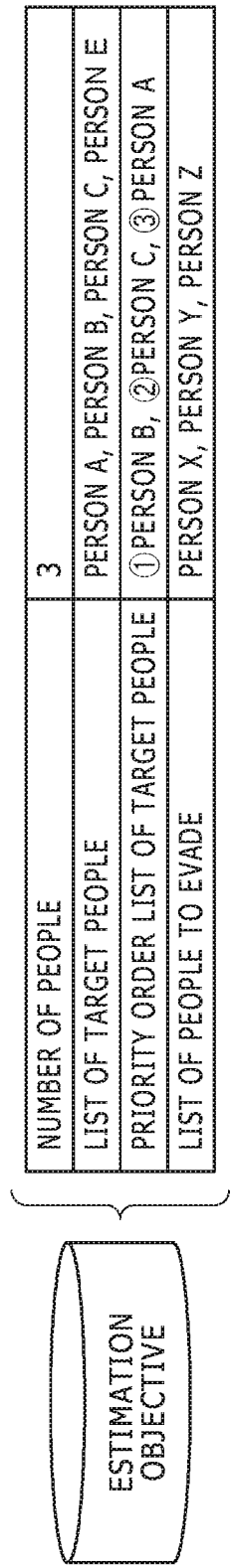
FIG. 8 is a diagram illustrating an example of information as to an estimation objective.

Next, with reference to a flowchart of FIG. 7, the order/region generation process, which is performed at step S15 in FIG. 4, will now be described below. In the example of FIG. 7, information as to an estimation objective as illustrated in FIG. 8 is used. In the example of FIG. 8, information as to an estimation objective stating that the number of people is "3," that the list of target people is "person A, person B, person C, person E," that the priority order list of target people is "1. person B, 2. person C, 3. person A," and that the list of people to evade is "person X, person Y, person Z" has been generated and stored in the estimation objective storage section 17, for example.

Figure 9A:
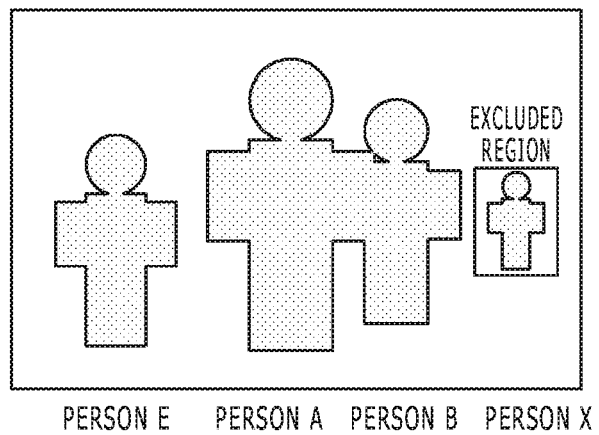
FIGS. 9A to 9C are diagrams illustrating example priority regions and an example excluded region.

At step S51, the optimization order/region generation section 15 refers to the list of people to evade in the estimation objective supplied from the estimation objective storage section 17, and sets the excluded region or regions. This process of setting the excluded region or regions will be described below with reference to FIG. 10. In the process of step S51, a surrounding region of person X, who is included in the list of people to evade, is set as the excluded region as illustrated in FIG. 9A.

Figure 9B:
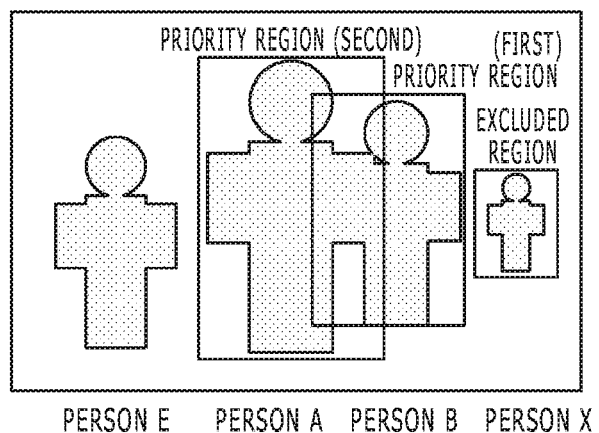

At step S52, the optimization order/region generation section 15 refers to the priority order list in the estimation objective supplied from the estimation objective storage section 17, and sets a priority region or regions with a rank or ranks in the order of priority. This process of setting the priority region or regions with the rank or ranks in the order of priority will be described below with reference to FIG. 11. In the process of step S52, a surrounding region of person A, who is included in the priority order list of target people, and a surrounding region of person B, who is included in the priority order list of target people, are set as a priority region (second) and a priority region (first), respectively, as illustrated in FIG. 9B, in addition to the setting of the excluded region as illustrated in FIG. 9A.

Figure 9C:
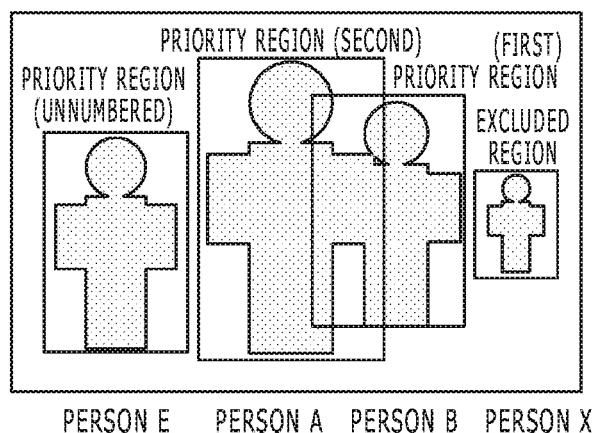

At step S53, the optimization order/region generation section 15 refers to the priority order list in the estimation objective supplied from the estimation objective storage section 17, and sets an unlisted priority region or regions. This process of setting the unlisted priority region or regions will be described below with reference to FIG. 12. In the process of step S53, a surrounding region of person E, who is included in the list of target people but who does not rank in the order of priority, is set as a priority region (unnumbered) as illustrated in FIG. 9C, in addition to the setting of the excluded region as illustrated in FIG. 9A and the setting of the priority regions as illustrated in FIG. 9B.

The order and the regions are set as described above, and the order/region control information representing the order and the regions is outputted to the pose optimization section 16. Note that the above-described procedure is merely an example, and that the excluded region, the priority region, and so on may be determined on the basis of information as to the identified individual and the degree of priority.

Next, with reference to a flowchart of FIG. 10, the process of setting the excluded region or regions, which is performed at step S51 in FIG. 7, will now be described below.

At step S71, the optimization order/region generation section 15 determines whether or not one or more people are registered in the list of people to evade in the estimation objective supplied from the estimation objective storage section 17. If it is determined at step S71 that one or more people are registered in the list of people to evade in the estimation objective, control proceeds to step S72.

At step S72, the optimization order/region generation section 15 selects one person identified in the person information supplied from the person detection/identification section 13. At step S73, it is determined whether the selected person is included in the list of people to evade in the estimation objective. If it is determined at step S73 that the selected person is included in the list of people to evade, control proceeds to step S74.

At step S74, the optimization order/region generation section 15 sets a surrounding region of the selected person as the excluded region. If it is determined at step S73 that the selected person is not included in the list of people to evade, control skips step S74 and proceeds to step S75.

At step S75, it is determined whether all the people included in the list of people to evade have been dealt with, and if it is determined that all the people have been dealt with, the process of setting the excluded region or regions (i.e., an excluded region setting process) is finished.

If it is determined at step S75 that all the people have not yet been dealt with, control returns to step S72, and the subsequent processes are repeated.

If it is determined at step S71 that no person is registered in the list of people to evade in the estimation objective, control skips steps S72 to S75, and the excluded region setting process is finished.

Next, with reference to a flowchart of FIG. 11, the process of setting the priority region or regions (i.e., a priority region setting process) using the priority order list, which is performed at step S52 in FIG. 7, will now be described below.

At step S91, the optimization order/region generation section 15 determines whether or not one or more people are registered in the priority order list of target people in the estimation objective supplied from the estimation objective storage section 17. If it is determined at step S91 that one or more people are registered in the priority order list of target people, control proceeds to step S92.

At step S92, the optimization order/region generation section 15 selects one person who ranks higher than any other remaining person in the priority order list. At step S93, the optimization order/region generation section 15 determines whether the selected person is included in the individual or individuals identified in the person information supplied from the person detection/identification section 13. If it is determined at step S93 that the selected person is included in the individual or individuals identified in the person information, control proceeds to step S94.

At step S94, the optimization order/region generation section 15 sets a surrounding region of the selected person as a priority region with a number (a smaller number for a higher rank). If it is determined at step S93 that the selected person is not included in the individual or individuals identified in the person information, control skips step S94 and proceeds to step S95.

At step S95, it is determined whether all the people included in the priority order list of target people have been dealt with, and if it is determined that all the people have been dealt with, the priority region setting process using the priority order list is finished.

If it is determined at step S95 that all the people have not yet been dealt with, control returns to step S92, and the subsequent processes are repeated.

If it is determined at step S91 that no person is registered in the priority order list of target people, control skips steps S92 to S95, and the priority region setting process using the priority order list is finished.

Figure 12:
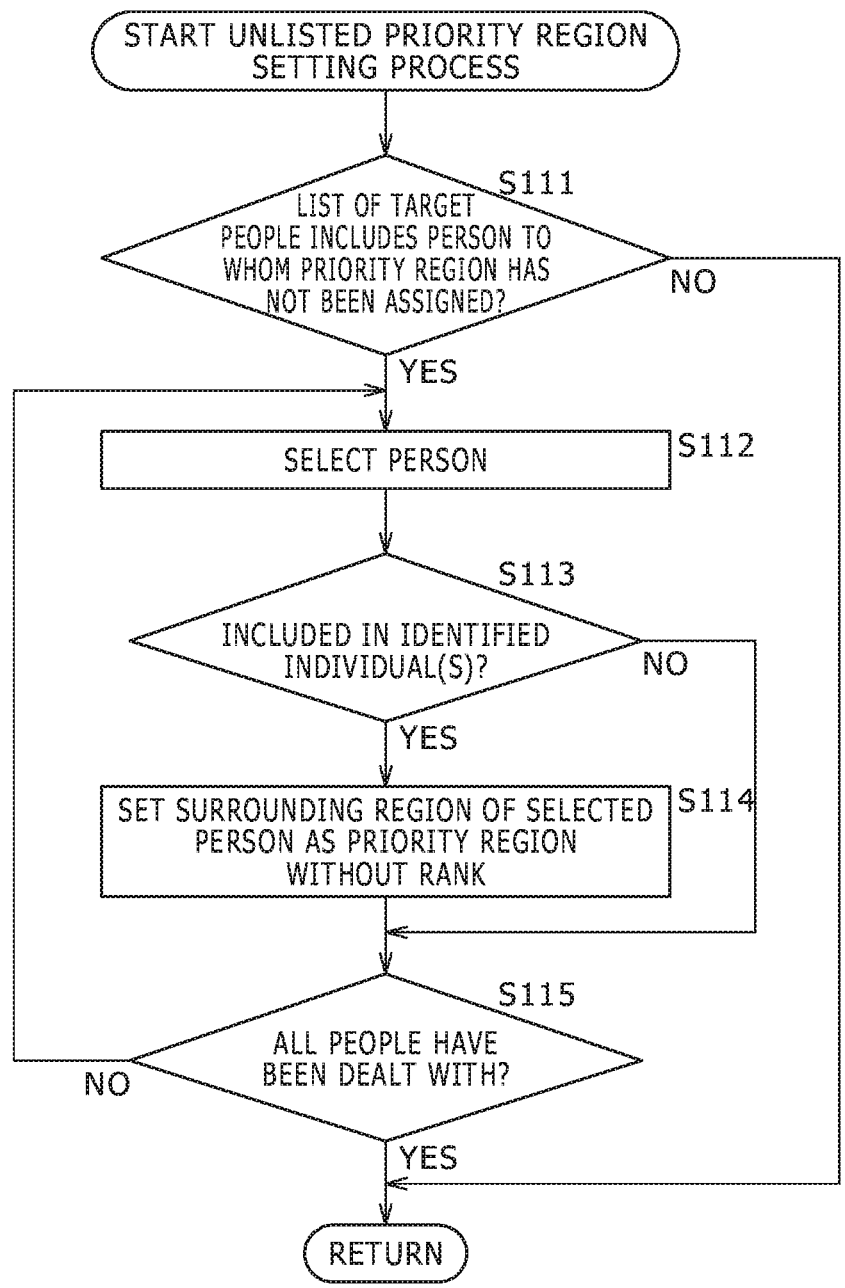
FIG. 12 is a flowchart for explaining an unlisted priority region setting process, which is performed at step S53 in FIG. 7.

Next, with reference to a flowchart of FIG. 12, the process of setting the unlisted priority region or regions (i.e., an unlisted priority region setting process), which is performed at step S53 in FIG. 7, will now be described below.

At step S111, the optimization order/region generation section 15 determines whether the list of target people in the estimation objective supplied from the estimation objective storage section 17 includes a person to whom a priority region has not been assigned. If it is determined at step S111 that the list of target people includes a person to whom a priority region has not been assigned, control proceeds to step S112.

At step S112, the optimization order/region generation section 15 selects one person to whom a priority region has not been assigned. At step S113, the optimization order/region generation section 15 determines whether the selected person is included in the individual or individuals identified in the person information supplied from the person detection/identification section 13. If it is determined at step S113 that the selected person is included in the individual or individuals identified in the person information, control proceeds to step S114.

At step S114, the optimization order/region generation section 15 sets a surrounding region of the selected person as a priority region without a rank. If it is determined at step S113 that the selected person is not included in the individual or individuals identified in the person information, control skips step S114 and proceeds to step S115.

At step S115, it is determined whether all the people to whom the priority region has not been assigned have been dealt with, and if it is determined that all the people have been dealt with, the unlisted priority region setting process is finished.

If it is determined at step S115 that all the people have not yet been dealt with, control returns to step S112, and the subsequent processes are repeated.

If it is determined at step S111 that the list of target people does not include a person to whom a priority region has not been assigned, control skips steps S112 to S115, and the unlisted priority region setting process is finished.

Next, with reference to a flowchart of FIG. 13, the pose optimization process, which is performed at step S16 in FIG. 4, will now be described below.

The human body region information is inputted from the human body region extraction section 12 to the energy optimization section 54. The order/region control information is inputted from the optimization order/region generation section 15 to the control section 51, and is inputted to the initial pose estimation section 52 and the weight map generation section 53 through the control section 51.

At step S151, the control section 51 selects one of the priority regions that ranks higher than any other remaining priority region in the order of priority. At step S152, the initial pose estimation section 52 sets the initial pose for the priority region selected by the control section 51. The initial pose estimation section 52 outputs the information as to the set initial pose to the energy optimization section 54.

At step S153, the weight map generation section 53 generates the weight map used when dealing with the priority region selected by the control section 51. That is, as described above, the weights are generated for the region corresponding to the target person for whom the estimation is to be performed, the surrounding region of each person for whom the estimation has already been performed, and the excluded region or regions, on the basis of the order/region control information and the information as to the region corresponding to the person for whom the estimation has already been performed. The weight map generation section 53 outputs the weight map, which is the information as to the generated weights, to the energy optimization section 54.

At step S154, the energy optimization section 54 optimizes the pose so as to minimize the degree of disagreement (i.e., energy) determined by the pose of the human body model in relation to the human body region information supplied from the human body region extraction section 12. At this time, in the energy optimization section 54, the initial values of the position and pose of the human body model supplied from the initial pose estimation section 52 are used, and the weight map supplied from the weight map generation section 53 is taken into account in the optimization control and the calculation of the energy to avoid the influence of each region for which the estimation has already been performed and of each excluded region.

The energy optimization section 54 outputs the information as to the optimized pose to the subsequent stage (not shown) and the pose information storage section 55. In addition, the energy optimization section 54 outputs, to the control section 51, the notification of the completion of the pose estimation for the target person.

The control section 51 acquires the number of people in the estimation objective from the estimation objective storage section 17. At step S155, in response to the notification of the completion from the energy optimization section 54, the control section 51 determines whether the number of people in the estimation objective has been reached. If it is determined at step S155 that the number of people in the estimation objective has been reached, the pose optimization process is finished.

Meanwhile, if it is determined at step S155 that the number of people in the estimation objective has not yet been reached, control returns to step S151, and the subsequent processes are repeated.

Figure 13:
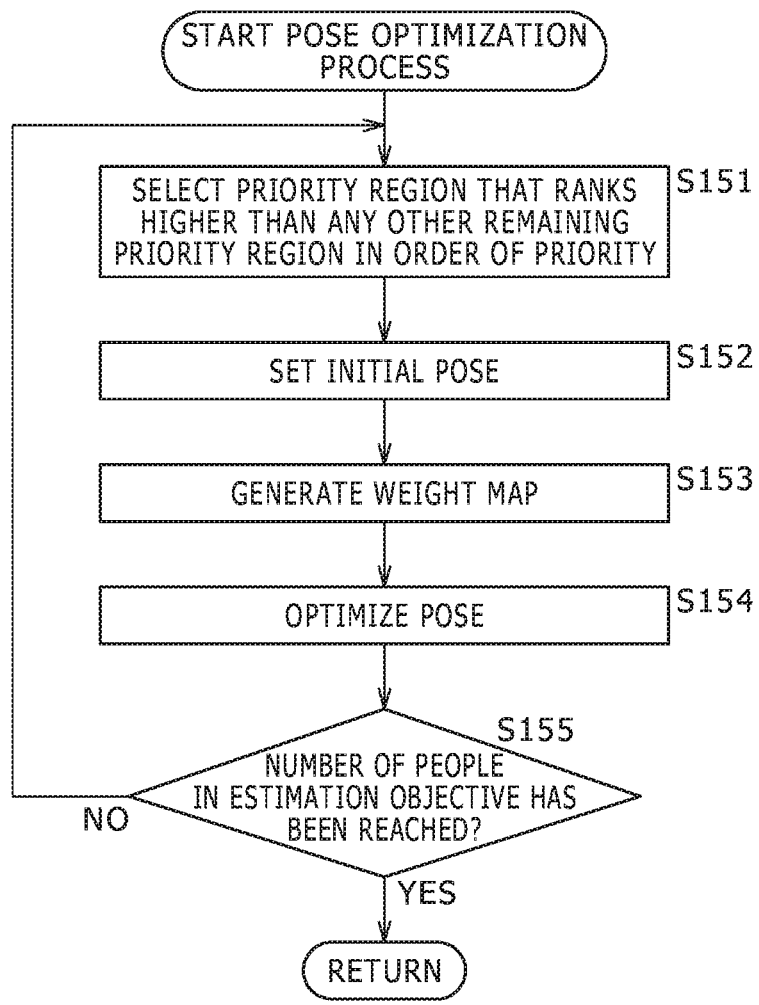
FIG. 13 is a flowchart for explaining a pose optimization process, which is performed at step S16 in FIG. 4.

In the example of FIG. 13, a condition for stopping the procedure at step S155 is that the number of people in the estimation objective is reached, and the number of people is determined by the estimation objective. However, for example, an upper limit may not be set on the number of people, and the above procedure may be continued until it becomes difficult to perform the pose estimation. Alternatively, the above procedure may be continued until the total number of people the faces of whom have been detected by the person detection/identification section 13 is reached (the number of people may be counted in the input image to determine the number of people for whom the pose estimation is to be performed).

As described above, according to the present embodiment, in the case where a plurality of people exist, the pose estimation processes are performed in succession with the order of priority defined for the people, and this leads to faster and more stable processing.

In the case where an identification of a person is possible through face recognition (individual identification), a controller, a marker, or the like, the user can specify the order of priority beforehand to enable a more stable pose estimation that suits a purpose.

Further, in the case where a plurality of people exist, a person or people to exclude can be defined directly, or a person or people who rank lowest in the order of priority can be defined as a person or people to exclude, to make the processing faster while reducing the probability of an erroneous estimation.

Still further, in the case where the number of people can be identified through face detection or the like, the number of people for whom the pose estimation is to be performed can be limited to make the processing faster while reducing the probability of an erroneous pose estimation.

As described above, according to the present embodiment, it is possible to achieve fast and stable processing even in the case where the poses of a plurality of people are estimated simultaneously.

<Personal Computer>

The above-described series of processes may be implemented either in hardware or in software. In the case where the series of processes is implemented in software, a program that forms the software is installed onto a computer. Examples of such a computer include a computer having a dedicated hardware configuration, and a general-purpose personal computer or the like that, when various programs are installed thereon, becomes capable of performing various functions.

FIG. 14 is a block diagram illustrating an exemplary hardware configuration of a personal computer 500 that performs the above-described series of processes in accordance with the program.

In the personal computer 500, a central processing unit (CPU) 501, a read-only memory (ROM) 502, and a random-access memory (RAM) 503 are connected with each other via a bus 504.

Further, an input/output interface 505 is connected to the bus 504. An input section 506, an output section 507, a storage section 508, a communication section 509, and a drive 510 are connected to the input/output interface 505.

The input section 506 includes a keyboard, a mouse, a microphone, and/or the like. The output section 507 includes a display, a loudspeaker, and/or the like. The storage section 508 includes a hard disk, a nonvolatile memory, and/or the like. The communication section 509 includes a network interface and/or the like. The drive 510 drives a removable recording medium 511, such as a magnetic disk, an optical disc, a magneto-optical disk, or a semiconductor memory.

In the personal computer 500 having the above structure, the CPU 501 loads the program, which is stored in the storage section 508, for example, into the RAM 503 via the input/output interface 505 and the bus 504, and executes the program. The above-described series of processes is thus performed.

The program to be executed by the computer (i.e., the CPU 501) may be recorded on the removable recording medium 511 and be thus provided. The removable recording medium 511 is, for example, a packaged medium including a magnetic disk (e.g., a flexible disk), an optical disc (e.g., a compact disc read-only memory (CD-ROM), a digital versatile disc (DVD), or the like), a magneto-optical disk, a semiconductor memory, or the like. Alternatively, the program may be provided to the computer via a wired or wireless communication medium, such as a local area network, the Internet, or digital satellite broadcasting.

In the computer, the removable recording medium 511 may be mounted on the drive 510 to allow the program to be installed into the storage section 508 via the input/output interface 505. Alternatively, the program may be received by the communication section 509 via the wired or wireless communication medium and be installed into the storage section 508. Alternatively, the program may be installed in the ROM 502 or the storage section 508 beforehand.

Note that the program executed by the computer may be either a program that allows the processes to be performed chronologically in an order as described in the present specification, or a program that allows some of the processes to be performed in parallel or performed at times when they need be performed, such as when a call has been issued.

Also note that the steps implemented by the program recorded on the recording medium and described in the present specification may naturally be performed chronologically in order of description but may not necessarily be performed chronologically. Some steps may be performed in parallel or independently of one another.

Also note that the term "system" as used in the present specification may refer to a whole system made up of a plurality of devices.

Note that embodiments of the present disclosure are not limited to the above-described embodiment, and that various modifications are possible without departing from the scope of the gist of the present disclosure.

For example, an embodiment of the present disclosure may be implemented by cloud computing, in which a single function is realized by a plurality of devices cooperating and sharing processes via a network.

Also note that components incorporated in a single apparatus (or processor) in the foregoing description may be divided and incorporated separately into two or more apparatuses (processors). Conversely, components that have been described above to be contained in different apparatuses (or processors) may be incorporated into a single apparatus (or processor). Also note that any other component that has not been mentioned above may naturally be added to any apparatus (or processor) described above. Further, as long as the structure and operation of the system as a whole are not changed significantly, some of the components of one apparatus (or processor) may instead be contained in another apparatus (or processor). That is, the present technique is not limited to the above-described embodiment, and various modifications are possible without departing from the scope of the gist of the present technique.

While a preferred embodiment of the present disclosure has been described in detail above with reference to the accompanying drawings, the technical scope of the present disclosure is not limited to the above-described preferred embodiment. It should be understood that a person skilled in the art to which the present disclosure pertains can conceive various alterations and modifications within the scope of the technical idea recited in the appended claims, and that they will naturally come under the technical scope of the present disclosure.

Note that the present technique may have the following configurations.

(1) An image processing apparatus including:
a priority degree setting section configured to set a degree of priority for each of surrounding regions of a plurality of people detected from an input image; and
a pose estimation section configured to estimate poses of human body models for human body regions extracted from the input image one after another, on the basis of the surrounding regions of one or more of the people selected using the degrees of priority set by the priority degree setting section.

(2) The image processing apparatus as described in (1) above, wherein the priority degree setting section sets the degree of priority in accordance with the size of a detection frame of a face detected by face detection.

(3) The image processing apparatus as described in (1) above, wherein the priority degree setting section sets the degree of priority in accordance with the degree of closeness of a human body based on depth information of the human body.

(4) The image processing apparatus as described in (1) above, wherein the priority degree setting section sets the degree of priority using a distance value calculated from a result of pose estimations for the plurality of people in an immediately previous frame dealt with.

(5) The image processing apparatus as described in any one of (1) to (4) above, further including
an individual identification section configured to identify an individual from the input image,
wherein the pose estimation section estimates the poses of the human body models for the human body regions extracted from the input image one after another, on the basis of a degree of priority specified via an interface designed for a user to specify a degree of priority of the individual identified by the individual identification section.

(6) The image processing apparatus as described in (5) above, wherein the individual identification section identifies the individual from the input image by face recognition.

(7) The image processing apparatus as described in (5) above, wherein the individual identification section identifies the individual from the input image through a detectable or discernible controller held by the individual, or a marker attached to the individual.

(8) The image processing apparatus as described in (5) above, wherein the individual identification section identifies the individual from the input image through a characteristic color in the surrounding region of the individual.

(9) The image processing apparatus as described in any one of (1) to (8) above, wherein
the priority degree setting section sets, out of the surrounding regions of the plurality of people, a surrounding region having a low degree of priority as an excluded region; and
the pose estimation section estimates the poses of the human body models for the human body regions extracted from the input image one after another, with exclusion of the excluded region set by the priority degree setting section.

(10) The image processing apparatus as described in (9) above, wherein the pose estimation section prohibits the successive estimations of the poses of the human body models for the human body regions extracted from the input image in the excluded region set by the priority degree setting section.

(11) The image processing apparatus as described in any one of (1) to (10) above, further including
a number limiting section configured to limit the number of people to be dealt with to an upper-limit number,
wherein the pose estimation section prohibits the successive estimations of the poses of the human body models for a greater number of people than the upper-limit number set by the number limiting section.

(12) The image processing apparatus as described in (11) above, wherein the number limiting section limits the number of people to be dealt with on the basis of the number of faces detected by face detection.

(13) The image processing apparatus as described in (11) above, wherein the number limiting section limits the number of people to be dealt with on the basis of a specification by a user.

(14) An image processing method employed by an image processing apparatus, including:
setting a degree of priority for each of surrounding regions of a plurality of people detected from an input image; and
estimating poses of human body models for human body regions extracted from the input image one after another, on the basis of the surrounding regions of one or more of the people selected using the set degrees of priority.

The present disclosure contains subject matter related to that disclosed in Japanese Priority Patent Application JP 2015-237227 filed in the Japan Patent Office on Dec. 4, 2015, the entire content of which is hereby incorporated by reference.

What is claimed is:

1. An image processing apparatus comprising:
a priority degree setting section configured to set a degree of priority for each of surrounding regions of a plurality of people detected from an input image; and
a pose estimation section configured to estimate poses of human body models for human body regions extracted from the input image one after another, on a basis of the surrounding regions of one or more of the people selected using the degrees of priority set by the priority degree setting section, wherein at least one of:
the priority degree setting section sets the degree of priority in accordance with a size of a detection frame of a face detected by face detection, and
the priority degree setting section sets the degree of priority in accordance with a degree of closeness of a human body based on depth information of the human body.

2. The image processing apparatus according to claim 1, wherein the degree of closeness of the human body is referenced to a distance from the user.

3. The image processing apparatus according to claim 1, wherein the priority degree setting section sets the degree of priority using a distance value calculated from a result of pose estimations for the plurality of people in an immediately previous frame dealt with.

4. The image processing apparatus according to claim 1, further comprising
an individual identification section configured to identify an individual from the input image,
wherein the pose estimation section estimates the poses of the human body models for the human body regions extracted from the input image one after another, on a basis of a degree of priority specified via an interface designed for a user to specify a degree of priority of the individual identified by the individual identification section.

5. The image processing apparatus according to claim 4, wherein the individual identification section identifies the individual from the input image by face recognition.

6. The image processing apparatus according to claim 4, wherein the individual identification section identifies the individual from the input image through a detectable or discernible controller held by the individual, or a marker attached to the individual.

7. The image processing apparatus according to claim 4, wherein the individual identification section identifies the individual from the input image through a characteristic color in the surrounding region of the individual.

8. The image processing apparatus according to claim 1, wherein
the priority degree setting section sets, out of the surrounding regions of the plurality of people, a surrounding region having a low degree of priority as an excluded region; and
the pose estimation section estimates the poses of the human body models for the human body regions extracted from the input image one after another, with exclusion of the excluded region set by the priority degree setting section.

9. The image processing apparatus according to claim 8, wherein the pose estimation section prohibits the successive estimations of the poses of the human body models for the human body regions extracted from the input image in the excluded region set by the priority degree setting section.

10. The image processing apparatus according to claim 1, further comprising
a number limiting section configured to limit a number of people to be dealt with to an upper-limit number,
wherein the pose estimation section prohibits the successive estimations of the poses of the human body models for a greater number of people than the upper-limit number set by the number limiting section.

11. The image processing apparatus according to claim 10, wherein the number limiting section limits the number of people to be dealt with on a basis of a number of faces detected by face detection.

12. The image processing apparatus according to claim 10, wherein the number limiting section limits the number of people to be dealt with on a basis of a specification by a user.

13. An image processing method employed by an image processing apparatus, comprising:
setting a degree of priority for each of surrounding regions of a plurality of people detected from an input image;
estimating poses of human body models for human body regions extracted from the input image one after another, on a basis of the surrounding regions of one or more of the people selected using the set degrees of priority; and
identifying an individual from the input image,
wherein the estimating poses of the human body models for the human body regions extracted from the input image one after another, on a basis of a degree of priority specified via an interface designed for a user to specify a degree of priority of the individual identified.

14. The image processing method according to claim 13, wherein the identifying the individual includes identifying the individual from the input image by face recognition.

15. The image processing method according to claim 13, wherein the identifying the individual includes identifying the individual from the input image through a detectable or discernible controller held by the individual, or a marker attached to the individual.

16. The image processing method according to claim 13, wherein the identifying the individual includes identifying the individual from the input image through a characteristic color in the surrounding region of the individual.

17. An image processing apparatus comprising:
a priority degree setting section configured to set a degree of priority for each of surrounding regions of a plurality of people detected from an input image;
a pose estimation section configured to estimate poses of human body models for human body regions extracted from the input image one after another, on a basis of the surrounding regions of one or more of the people selected using the degrees of priority set by the priority degree setting section;
a number limiting section configured to limit a number of people to be dealt with to an upper-limit number,
wherein the pose estimation section prohibits the successive estimations of the poses of the human body models for a greater number of people than the upper-limit number set by the number limiting section.

18. The image processing apparatus according to claim 17, wherein the number limiting section limits the number of people to be dealt with on a basis of a number of faces detected by face detection.

19. The image processing apparatus according to claim 17, wherein the number limiting section limits the number of people to be dealt with on a basis of a specification by a user.

* * * * *